United States Patent [19]

McGregor et al.

[11] Patent Number: 4,693,936

[45] Date of Patent: Sep. 15, 1987

[54] LOW COEFFICIENT OF FRICTION MAGNET WIRE ENAMELS

[75] Inventors: Charles W. McGregor; Melody L. Sutto, both of Fort Wayne, Ind.

[73] Assignee: Essex Group, Inc., Fort Wayne, Ind.

[21] Appl. No.: 873,831

[22] Filed: Jun. 9, 1986

Related U.S. Application Data

[63] Continuation of Ser. No. 606,425, May 2, 1984, abandoned.

[51] Int. Cl.[4] .............................................. B32B 27/00

[52] U.S. Cl. .............................. 428/383; 174/110 N; 174/110 S; 174/110 SR; 174/120 R; 174/120 SR; 428/375; 428/379; 525/431; 525/474; 528/26

[58] Field of Search ......................................... 428/383

[56] References Cited

U.S. PATENT DOCUMENTS

| | | | |
|---|---|---|---|
| 3,413,148 | 11/1968 | Sattler et al. | 117/218 |
| 3,446,660 | 5/1969 | Pendleton | 117/218 |
| 3,583,885 | 6/1971 | Preston | 117/218 |
| 3,632,440 | 1/1972 | Preston | 117/218 |
| 3,681,282 | 8/1972 | Preston | 260/46.5 E |
| 3,686,030 | 8/1972 | Preston | 117/232 |
| 3,775,175 | 11/1973 | Merian | 117/218 |
| 3,779,991 | 12/1973 | Preston | 260/46.5 E |
| 3,856,566 | 12/1974 | Saunders | 117/218 |
| 4,002,797 | 1/1977 | Hacker et al. | 428/378 |
| 4,216,263 | 8/1980 | Otis et al. | 428/383 |
| 4,348,460 | 9/1982 | Saunders et al. | 428/383 |
| 4,350,737 | 9/1982 | Saunders et al. | 428/383 |
| 4,350,738 | 9/1982 | Saunders et al. | 428/383 |
| 4,385,436 | 5/1983 | Saunders et al. | 29/596 |
| 4,385,437 | 5/1983 | Saunders et al. | 29/596 |
| 4,390,590 | 6/1983 | Saunders et al. | 428/383 |
| 4,400,430 | 8/1983 | Miyake et al. | 428/383 |
| 4,404,331 | 9/1983 | Pauze | 525/424 |
| 4,410,592 | 10/1983 | Saunders et al. | 428/383 |
| 4,459,383 | 7/1984 | Lee | 428/379 |

FOREIGN PATENT DOCUMENTS

| | | | |
|---|---|---|---|
| 0033244 | 1/1981 | European Pat. Off. . | |
| 7407607 | 12/1974 | Netherlands | 525/431 |

*Primary Examiner*—George F. Lesmes
*Assistant Examiner*—S. A. Gibson
*Attorney, Agent, or Firm*—Harry J. Gwinnell

[57] ABSTRACT

An improved thermally stable, lubricious magnet wire enamel is disclosed which is particularly suitable for use as an outermost insulating, lubricating layer on a magnet wire substrate. The enamel comprises the reaction product of a tri-basic acid anhydride, a diisocyanate and a polyfunctional organosiloxane. The coating has a coefficient of friction, after application to magnet wire, of less than 0.10. It is also substantially all polyfunctional organosiloxane reacted, i.e. substantially no polyfunctional organosiloxane is capable of being extracted from the cured coating with organic solvents.

5 Claims, No Drawings

LOW COEFFICIENT OF FRICTION MAGNET WIRE ENAMELS

This is a continuation of application Ser. No. 606,425, filed on May 2, 1984, now abandoned.

DESCRIPTION

1. Technical Field

The field of art to which this invention pertains is silicon containing polymers and specifically low coefficient of friction magnet wire enamels.

2. Background Art

In the manufacture of electrical motors, the more magnet wire which can be inserted into a stator core, the more efficient the motor performance. In addition to motor efficiency considerations, motor manufacturers are also interested in manufacturing efficiency. Accordingly, such coils where possible are inserted automatically, generally by two methods: either a gun-winding method or a slot insertion method. In the older gun-winding method, the winding is done by carrying the wire into the stator slot by means of a hollow winding needle. Turns are made by a circular path of the gun to accommodate the individual coil slots. As described in Cal Towne's paper entitled "Motor Winding Insertion" presented at the Electrical/Electronics Insulation Conference, Boston, Mass. in September, 1979, in the more preferred slot insertion method, coils are first wound on a form, placed on a transfer tool and then pressed off the transfer tool into the stator core slots through insertion guides or blades. In order to accommodate these automated insertion methods, wire manufacturers have responded by producing magnet wires with insulating coatings with low coefficient of friction. Note, for example, U.S. Pat. Nos. 3,413,148; 3,446,660; 3,583,885; 3,632,440; 3,681,282; 3,686,030; 3,775,175; 3,779,991; 3,856,566; 4,002,797; 4,216,263; 4,348,460; 4,350,737; 4,350,738; 4,385,436; 4,385,437; 4,390,590; 4,400,430; 4,404,331; 4,410,592; and published European Patent Application Number 0-033-244, published Aug. 5, 1981 (Bulletin 8/31).

Typically, approaches of the past have included the blending of various lubricants into wire enamels and/or topically applying a lubricant to the finished magnet wire. The materials blended have included such things as silicone fluids, polyethylene, fatty acids, and esters of fatty acids, and alcohols. The topical applied lubricants have generally included light oils or paraffin wax solutions. None of these approaches have been totally successful in eliminating magnet wire windability and insertion problems. Blending has resulted in nonhomogeneous systems due to low solubility of lubricants in the enamels or, in the case of silicone fluids, an undesirable migration of the silicone fluid out of the magnet wire coating and onto other surfaces. Topically applied lubricants have also been extremely difficult to apply uniformly to magnet wire under production conditions and are subject to removal by necessary wiping and handling of the wire during processing.

Accordingly, what is needed in this art is an improved magnet wire enamel with a low coefficient of friction without the deficiencies of prior systems.

DISCLOSURE OF INVENTION

The present invention is directed to magnet wire enamel comprising a polyamideimide formed by the reaction of a tri-basic acid anhydride, a diisocyanate, and a polyfunctional organosiloxane. The resulting enamel, after applying to a magnet wire substrate, has a coefficient of friction less than 0.10. Furthermore, the polyfunctional organosiloxane is substantially completely reacted in the polymer, resulting in substantially no extraction of the polyfunctional organosiloxane from the polymer when treated with organic solvent.

Another aspect of the invention is magnet wire coated with above-described magnet wire enamel.

The foregoing, and other features and advantages of the present invention will become more apparent from the following description.

BEST MOST FOR CARRYING OUT THE INVENTION

The tri-basic acid anhydride useful with the present invention has the general formula

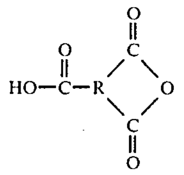

where R is at least trivalent and includes such things as: trimellitic anhydride; 2,6,7-naphthalene tricarboxylic anhydride; 3,3'4-diphenyl tricarboxylic anhydride; 3,3'4-benzophenone tricarboxylic anhydride; 1,3,4-diphenyl tricarboxylic anhydride; diphenyl sulfone 3,3'4-tricarboxylic anhydride; 3,4,10-perylene tricarboxylic anhydride; 3,4-dicarboxyphenyl 3-carboxyphenyl ether anhydride; ethylene tricarboxylic anhydride; 1,2,5-naphthalene tricarboxylic anhydride, etc.

As the isocyanate component, any polyisocyanate with at least 2 isocyanate groups having the generic formula $$O{=}C{=}N{-}R{-}N{=}C{=}O$$

where R is an organic radical, may be used, such as:

tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate
1,3-dimethyl-4,6-bis-(b-isocyanatoethyl)-benzene
3-(a-isocyanatoethyl)-phenylisocyanate
1-methyl-2,4-cyclohexylenediisocyanate-4,4'-biphenylenediisocyanate
3,3'-dimethyl-4,4'-biphenylenediisocyanate
3,3'-dimethoxy-4,4'-biphenylenediisocyanate 3,3'diethoxy-4,4'-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4''-triisocyanato-triphenylmethane
2,4,4'-triisocyanato-diphenylether
2,4,6-triisocyanato-1-methyl-3,5-diethylbenzene
o-tolidine-4,4'-diisocyanato
m-tolidine-4,4'-diisocyanato
benzophenone-4,4'-diisocyanato
biuret triisocyanates
polymethylenepolyphenylene isocyanate Polyfunctional organosiloxanes which may be used according to the present invention have the generic formula

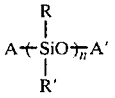

where n is greater than 1 and A and A' are terminal functional groups that can be reacted into the polyamide-imide backbone chain, are the same or different and are typically groups such as $—NH_2$, —OH, —COOH,

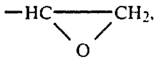

—NCO, $—CH{=}CH_2$, —R''—OH, etc., where R,R', and R'' are the same or different and are aliphatic, aromatic, branched aliphatic, etc., typically methyl, ethyl or phenyl. Such R groups may also contain groups reactive with the polyamide-imide backbone. If trifunctionality is desired either R or R' can contain a group the same as A or A'. Some examples of such organosiloxanes are (where the n's are the same or different and R and R' are alkyl groups)

The enamels of the present invention are typically formed by first reacting the anhydride component with the isocyanate component (note, for example, commonly assigned U.S. Pat. No. 4,374,221, the disclosure of which is incorporated by reference) followed by reaction with the organosiloxane. However, other methods of adding the organosiloxane to the polyamide-imide backbone such as reacting the organosiloxane with the anhydride prior to reaction with the isocyanate can also be used. After cooling, the reaction mixture is typically diluted with conventional magnet wire solvents to a solids content in the order of 30% by weight.

The organosiloxane typically constitutes about 0.5% to about 5.0% and preferably about 2% to 4% by weight of the enamel system, although this can be varied depending on the particular polyamide-imide and its ultimate use.

EXAMPLE 1

Using a refluxing technique water was removed from the NMP-xylene mixture. After refluxing, this mixture was cooled to 95° C. and TMA was added. The solution was continued to allow to cool until a temperature of 55° C. was obtained at which point the MDI was added. The temperature was increased 25° C. per hour and held at 105° C. until the percent COOH was 3.75%. The organopolysiloxane and benzyl alcohol were then added to the solution in the order specified in Table 1. After 20 minutes at 105° C., the temperature of the solution was raised to 130° C. and held there for two hours. The temperature was then raised 15° C. per 30 minutes and held at 155° C. to 160° C. for 90 minutes. When the percent COOH reached 1.4%, the reaction mixture was cut with the NMP and xylene mixture. The enamel was then cooled to 90° C. and cut again with a mixture of NMP and n-butyl alcohol. Using the Gardner-Holt scale, an enamel viscosity greater than Z-6 was measured. A further cut with 85:15-NMP:xylene was added until an enamel viscosity of Z-3-½ was obtained. The enamel was filtered at 80° C. The order of addition and relative amounts of materials are as set forth in Table 1.

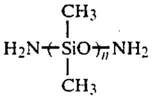

(SWS Silicone F-801)

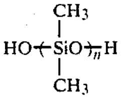

(Union Carbide L-9000)

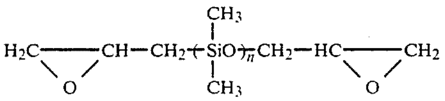

(Union Carbide L-9300)

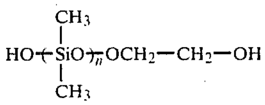

(Dow Corning Q4-3667)

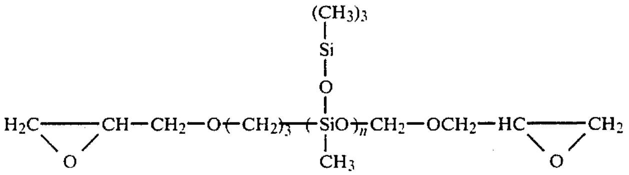

(Dow Corning X2-8-5024)

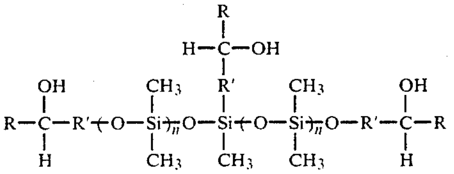

(Dow Corning 1248)

TABLE 1

| Material | Equivalents | WT. % |
|---|---|---|
| NMP (N—methylpyrrolidone) | — | 44.97 |
| Xylene | — | 11.25 |
| TMA (trimellitic anhydride) | 3.0 | 14.24 |
| MDI (methylenediisocyanate) | 3.0 | 18.55 |
| Dow Corning 1248 Organopolysiloxane | .01 | .99 |
| Benzyl Alcohol | .09 | .49 |
| NMP | — | 2.30 |
| Xylene | — | 3.21 |
| NMP | — | 2.0 |
| n-butyl alcohol | — | 2.0 |
| Final Solids = | | 29.1 |
| Gardner-Holt Viscosity = | | Z-3½ |
| Brookfield Viscosity = | | 5370 |
| Final % COOH = | | 1.39 |
| Effective Solids = | | 27.8 |
| Equivalent weight of organopolysiloxane = | | 2000 |
| Equivalent % TMA = | | 49.17 |
| Equivalent % MDI = | | 49.17 |
| Equivalent % Benzyl—OH = | | 1.49 |
| Equivalent % organopolysiloxane = | | 0.17 |

EXAMPLE 2

An enamel composition was prepared in the same manner as in Example 1 with the following modifications. The organopolysiloxane was added to the reaction mixture when the percent COOH reached 9.76% as opposed to the 3.75% of Example 1. The organopolysiloxane (2.0% based on polymer weight) was reacted for 10 minutes before the benzyl alcohol was added. See Table 2 for the order of reactant addition and relative amounts.

TABLE 2

| Material | Equivalents | WT. % |
|---|---|---|
| NMP | — | 45.17 |
| Xylene | — | 11.30 |
| TMA | 3.0 | 14.31 |
| MDI | 3.0 | 18.63 |
| Dow Corning 1248 Organopolysiloxane | .0056 | .55 |
| Benzyl Alcohol | .09 | .50 |
| NMP | — | 2.31 |
| Xylene | — | 3.23 |
| NMP | — | 2.01 |
| n-butyl alcohol | — | 2.01 |
| Final Solids = | | 33.9 |
| Gardner-Holt Viscosity = | | Z-2⅔ |
| Brookfield Viscosity = | | 4430 |
| Final % COOH = | | 1.68 |
| Effective Solids = | | 30.4 |
| Equivalent weight of organopolysiloxane = | | 2000 |
| Equivalent % TMA = | | 49.19 |
| Equivalent % MDI = | | 49.19 |
| Equivalent % Benzyl—OH = | | 1.52 |
| Equivalent % organopolysiloxane = | | 0.10 |

EXAMPLE 3

Using the same refluxing procedure as with Example 1 water was removed from the NMP-xylene mixture which also included the TMA, and the organopolysiloxane. They were all initially charged to a three liter flask. The solution was cooled down to 65° C. and the MDI was added. After 20 minutes the temperature was increased 15° C. per 45 minutes until temperature of 105° C. was reached. The percent COOH was 9.84% after 40 minutes. The butyl alcohol was then added. After 10 minutes the temperature was again increased 15° C. per 35 minutes and held at 160° C. After 90 minutes the percent COOH was 1.69% and the enamel was then cut with a solvent mixture of NMP and xylene. After cooling the enamel to 90° C., a NMP and n-butyl alcohol mixture was added. The enamel was filtered at 80° C.

TABLE 3

| Material | Equivalents | WT. % |
|---|---|---|
| NMP | — | 45.17 |
| Xylene | — | 11.28 |
| TMA | 3.0 | 14.31 |
| SWS F-801 organopolysiloxane | .0013 | .55 |
| MDI | 3.0 | 18.64 |
| Benzyl Alcohol | .09 | .50 |
| NMP | — | 2.31 |
| Xylene | — | 3.23 |
| NMP | — | 2.01 |
| n-butyl Alcohol | — | 2.01 |
| Final Solids = | | 34.1 |
| Brookfield Viscosity = | | 3300 cps |
| Final % COOH = | | 1.69 |
| Effective Solids = | | 30.5 |
| Equivalent Weight of organopolysiloxane = | | 8333 |
| Equivalent % of TMA = | | 49.23 |
| Equivalent % MDI = | | 49.23 |
| Equivalent % Benzyl—OH = | | 1.52 |
| Equivalent % organopolysiloxane = | | .02 |

EXAMPLE 4

This enamel was prepared in the same manner as Example 3 except that the reactive organopolysiloxane component constituted 3.6% of the polymer weight.

TABLE 4

| Material | Equivalents | WT. % |
|---|---|---|
| NMP | — | 44.97 |
| Xylene | — | 11.25 |
| TMA | 3.0 | 14.24 |
| SWS F-801 organopolysiloxane | .0024 | .99 |
| MDI | 3.0 | 18.55 |
| Benzyl Alcohol | .09 | .49 |
| NMP | — | 2.30 |
| Xylene | — | 3.21 |
| NMP | — | 2.00 |
| n-butyl alcohol | — | 2.00 |
| Final Solids = | | 35.2 |
| Gardner-Holt Viscosity = | | Z-3 |
| Brookfield Viscosity = | | 4700 cps |
| Final % COOH = | | 1.64 |
| Effective Solids = | | 31.0 |
| Equivalent Weight of organopolysiloxane = | | 8333 |
| Equivalent % TMA = | | 49.24 |
| Equivalent % MDI = | | 49.23 |
| Equivalent % Benzyl—OH = | | 1.50 |
| Equivalent % organopolysiloxane | | 0.03 |

EXAMPLE 5

The procedure followed in Example 1 was also performed here except for the exclusion of the reactive organopolysiloxane (control sample).

To demonstrate the improvement in coated wires according to the present invention the following tests were conducted. Standard 18 AWG copper wires were coated with a conventional THEIC polyester basecoat followed by application of the polyamide-imide topcoats of the above examples. The basecoat to topcoat ratios of the total enamel build on the wire ranged from 75–80:25–20. The enamels were cured by passing through a standard 20 foot gas fired oven with bottom and top zone temperatures of 620° F. and 804° F. respectively. A comparison of properties as shown in Table 5. Coefficient of friction entries in the Tables marked with an asterisk also contained a thin layer (e.g.

less than 0.1 mil) of external lubricant (a mixture of paraffin wax, beeswax and vaseline in roughly equal amounts applied out of conventional enamel solvents recited herein). Coefficient of friction values were determined using weights ranging from 2 to 22 pounds.

TABLE 5

| Example No. | Smoothness | Dissipation Factor at 240° C. | Scrape grams/mil | Coefficient of Friction |
|---|---|---|---|---|
| 1 | −9/−9* | .25 | 597 | .025*-.031* |
| 2 | −9/−9 | .33 | 617 | .035-.066 |
| 3 | −9/−9 | .06 | 600 | .067-.10 |
| 4 | −9/−9 | .26 | 596 | .043-.058 |
| 5 | −9/−9 | .13 | 588 | 0.20 >2 lbs. oscillation |

*A −9 rating = good

While the polymers according to the present invention can be used on any electrical conductor, they are preferably used on wires and specifically magnet wires. The wires are generally copper or aluminum. And wires ranging anywhere from 4 AWG to 42 AWG (American Wire Gauge) in diameter are coated, with 18 AWG being the most commonly coated wire. Wire coatings can be anywhere from 0.2-5 mils or any thickness desired, and preferably about 3.2 mils on 18 AWG wire when applied in 6 coatings of equal thickness with curing between coats. The coatings can be used as a sole insulation coat or part of a multicoat system in combination with other conventional polymer insulation, such as polyester, polyurethanes, polyvinyl formal, polyimides, etc., and combinations thereof. The polymer coatings of the present invention can also contain lubricants either externally on the coating, internally in the coating, or both. If a multicoat coating system is used, polyester basecoats are preferred and THEIC (trishydroxyethylisocyanurate)polyester basecoats particularly preferred. Note U.S. Pat. Nos. 3,342,780 and 3,249,578, the disclosures of which are incorporated by reference.

The enamels made according to the present invention can be applied by any conventional means such as coating dies, roller or felt application with viscosity adjustments made accordingly. Viscosity adjustments can be made by dilution with appropriate enamel solvents or diluents for any coating method. As the enamel solvents, any conventionally used, relatively inert, polar solvents such as N-methyl pyrrolidone, N,N-dimethyl or N,N-diethyl formamide, and N,N-diethyl acetamide can be used, and similarly any conventional hydrocarbon diluent such as xylene, Solvesso 100 (Exxon) or D59 hydrocarbon (Drake Petroleum Co.).

Conventional curing ovens can be used to heat treat the coated magnet wire. Inlet oven temperatures of the order of about 500°-700° F. (260° C.-571° C.), preferably about 580° F. (304° C.), and outlet oven temperatures of about 800°-1100° F. (427°-593° C.), and preferably about 900° F. (482° C.) are used for drying and curing.

While this invention has been described in terms of magnet wire insulation, this invention includes the use of this material as a free standing film, e.g. for such uses as phase insulation, coil wrapping, etc., and as varnishes for uses other than magnet wire insulation.

Although this invention has been shown and described with respect to detailed embodiments thereof, it will be understood by those skilled in the art that various changes in form and detail thereof may be made without departing from the spirit and scope of a claimed invention.

We claim:

1. An electrical conductor coated with an insulating layer of magnet wire enamel comprising a polyamideimide consisting essentially of the reaction product of a tri-basic anhydride, a diisocyanate and polyfunctional organosiloxane, the polyfunctional organosiloxane being reacted into the polymer backbone prior to application to the electrical conductor, said polyorganosiloxane being present in an amount of about 0.5% to about 5% by weight based on the weight of the enamel, the enamel having a coefficient of friction, after application to magnet wire, of less than 0.10 and the polyfunctional organosiloxane component being substantially non-solvent extractable after application to the wire.

2. The conductor of claim 1 wherein the tri-basic anhydride is trimellitic anhydride, the diisocyanate is methylene-diisocyanate, and the polyfunctional organosiloxane has the formula $$A\!\left(\begin{array}{c} R \\ | \\ SiO \\ | \\ R' \end{array}\right)_{\!n}\!A'$$

where n is greater than 1, R and R' are alkyl groups, and A and A' are the same or different and are selected from the group consisting of $-NH_2$, $-OH$ and $-COOH$.

3. The conductor of claims 1 or 2 including a layer of polyester between the conductor and the polyamideimide.

4. The conductor of claims 1 or 2 wherein the conductor is copper or aluminum wire.

5. The conductor of claims 1 or 2 additionally containing a layer of paraffin containing lubricant on the polyamideimide.

* * * * *